United States Patent [19]

Ducrocq et al.

[11] Patent Number: 5,102,449
[45] Date of Patent: Apr. 7, 1992

[54] INCLUSION DECANTING PROCESS FOR NICKEL-BASED SUPERALLOYS AND OTHER METALLIC MATERIALS

[75] Inventors: Christian A. B. Ducrocq, Taverny; Marcel Garnier, Uriage; Gérard Lemaitre, Asnieres; Pascal J. Rivat; Pierre M. Vernay, both of Meylan, all of France

[73] Assignee: Societe Nationale d'Etude et de Construction de Moteurs d'Aviation "S.N.E.C.M.A.", Paris, France

[21] Appl. No.: 754,316

[22] Filed: Sep. 4, 1991

Related U.S. Application Data

[63] Continuation of Ser. No. 522,212, May 11, 1990.

[51] Int. Cl.⁵ .................................... C22B 4/00
[52] U.S. Cl. ........................ 75/70.18; 75/628; 75/960
[58] Field of Search ............ 75/10.67, 960, 628, 75/10.18

[56] References Cited

U.S. PATENT DOCUMENTS 4,786,320  11/1988  Hobson et al. ................. 75/10.67
4,863,509  9/1989  Metz ................................ 75/333

FOREIGN PATENT DOCUMENTS 2316026  1/1977  France.
2396612  2/1979  France.
2397251  2/1979  France.
2457730  12/1980  France.
2561761  9/1985  France.
817069  3/1981  U.S.S.R. ........................ 75/10.18

Primary Examiner—Melvyn J. Andrews
Attorney, Agent, or Firm—Oblon, Spivak, McClelland, Maier & Neustadt

[57] ABSTRACT

In a method of remelting metallic materials, particularly nickel-based superalloys, in which the melting operation is carried out in a cooled copper crucible under clean vacuum conditions by means of electromagnetic inductors, the magnetic field applied to the mass of molten metal has a frequency between 50 Hz and $5 \times 10^6$ Hz, preferably between $5 \times 10^3$ Hz and $5 \times 10^5$ Hz, so as to effect simultaneously electromagnetic stirring of the liquid metal and a surface concentration at the cold walls of the mass to be recast of all the non-conductive particles, especially ceramic inclusions, thereby achieving an inclusion decanting.

3 Claims, 2 Drawing Sheets

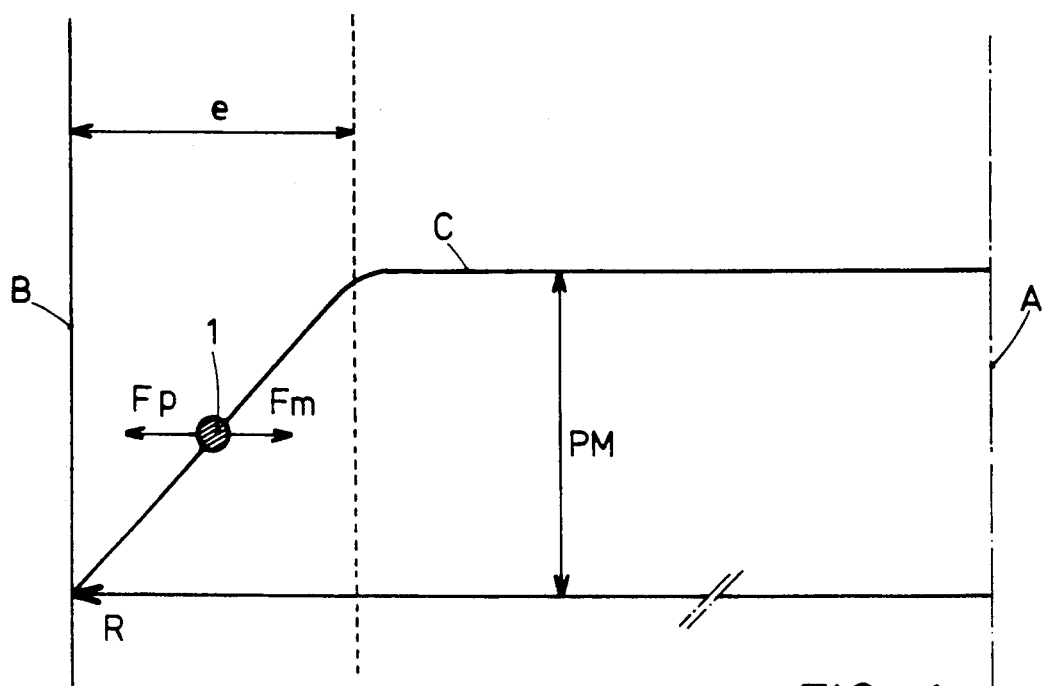
FIG : 1
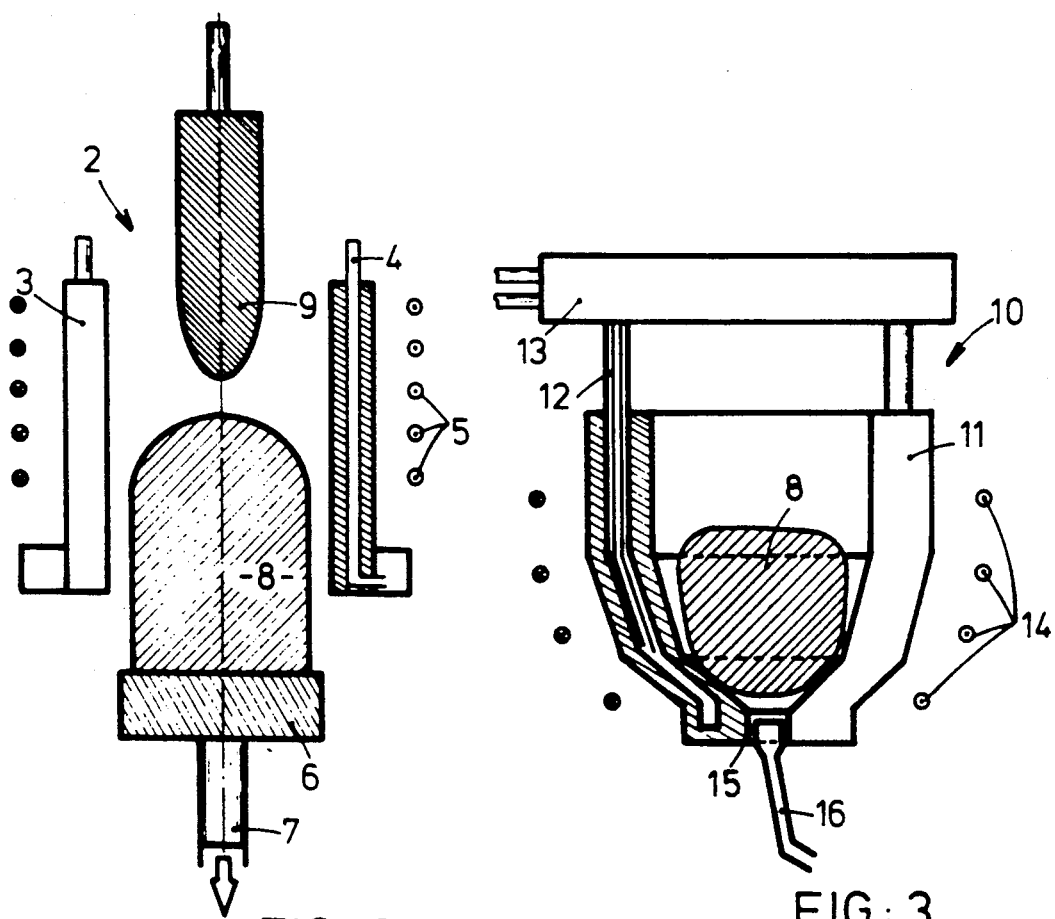
FIG : 2
FIG : 3

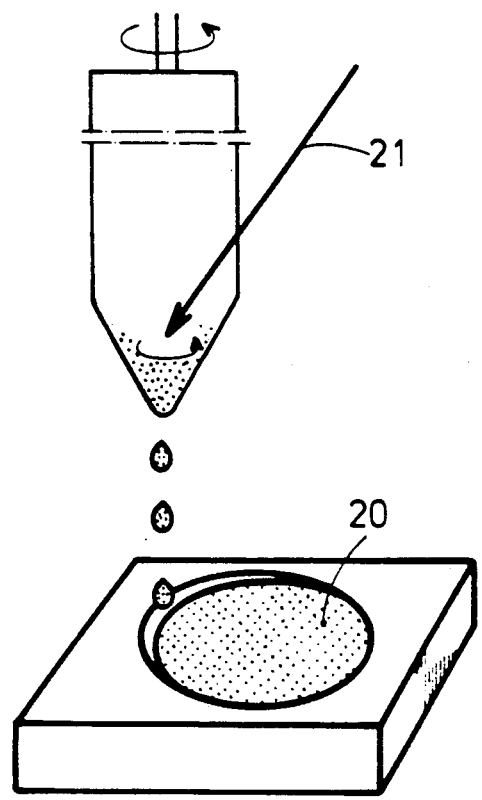
FIG:4a
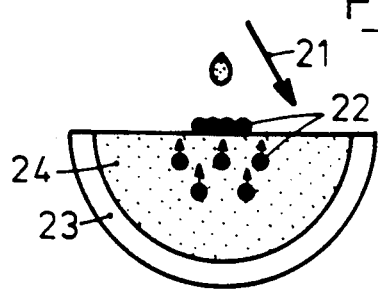
FIG:4b
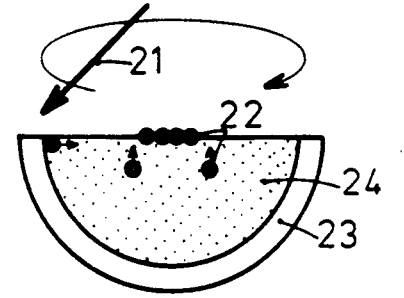
FIG:4c
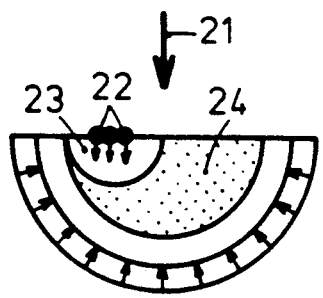
FIG:4d
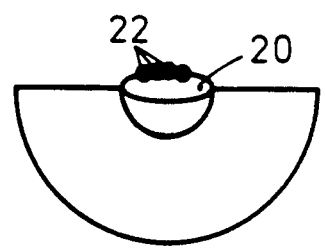
FIG:4e

INCLUSION DECANTING PROCESS FOR NICKEL-BASED SUPERALLOYS AND OTHER METALLIC MATERIALS

This application is a continuation of application Ser. No. 07/522,212, filed on May 11, 1990, now abandoned.

BACKGROUND OF THE INVENTION

1. Field of the invention

The present invention relates to an inclusion decanting process for metallic materials, particularly nickel-based superalloys.

The techniques normally used nowadays for the processing of metallic materials such as nickel-based superalloys involve melting operations in crucibles made of a ceramic type refractory material and carried out under vacuum in a furnace. During such operations a metal/ceramic reaction occurs, which inevitably results in the presence of ceramic inclusions in the material obtained. Refining the metal thus becomes necessary each time the conditions of use demand that a so-called superclean alloy should be obtained, and this is particularly the case with nickel-based superalloys intended for aeronautical applications, such as in the manufacture of parts for aeronautical turbine engines or other propulsion units. For example, in some cases, it may be desired to obtain ingots intended for the production of nickel-based powders, with a view to manufacturing parts by known powder metallurgical techniques. It is reconized that the presence of inclusions in such parts is a factor detrimental to their operating performance, especially when the parts are subject to oligocyclic fatigue stresses.

2. Summary of the prior art

To achieve the necessary refining of the superalloy, various methods have been proposed involving remelting the material in clean conditions and in a manner such as to ensure inclusion separation.

It is thus known to use a cooled crucible in which the superalloy acts as a decanting crucible for the liquid metal, melting being effected by means of an electron beam or plasma beam.

However, these methods involve a delicate procedure in plant which is often very complex and costly. In addition, depending on the intended use of the product, the effectiveness of the inclusion separation achieved is sometimes inadequate.

To solve these problems without suffering the drawbacks of the previously known solutions, the invention proposes an application of the principles of magnetohydrodynamics to liquid metals.

Examples of the application of these principles, particularly in applying an electromagnetic field to a flow of liquid metal, are disclosed in FR-A-2 316 026, FR-A-2 396 612, FR-A-2 397 251, FR-A-2 457 730 and EP-A-0 083 898.

Also, FR-A-2 452 958 describes an electromagnetic device for the separation of inclusions contained in an electrically conducting fluid in which the alternating magnetic field reacts with external currents, induced in a ring of liquid metal. However, solutions of this type cannot be exploited industrially in the case of the remelting of nickel-based superalloys for which the melting temperatures are in excess of 1300° C., and superclean conditions are demanded.

Devices or processes envizaged, for example, in FR-A-2 561 761 or EP-A-0 234 536, provide for evacuation of inclusions situated at the top of a cold crucible. However, these arrangements are found to be incompatible with industrial applications in which the continuous feeding of the metal to be remelted is effected from the top of the crucible.

SUMMARY OF THE INVENTION

According to the invention there is provided a method of remelting metallic materials, particularly nickel-based superalloys, wherein said material is placed in a cooled copper crucible referred to as a cold crucible, and electromagnetic inductors are used to melt said material under clean vacuum conditions in said cold crucible, the method including the step of applying a magnetic field to the molten metal mass in said cold crucible at a frequency within the range of from 50 Hz to $5.10^6$ Hz so as to effect simultaneously electromagnetic stirring of the liquid metal and a surface concentration at the cold walls of the mass to be recast of all the non-conductive particles, especially ceramic inclusions, thus achieving an inclusion decanting.

This method is capable of industrial application under simple and convenient conditions, and enables improved results to be obtained without the drawbacks previously experienced.

The preferred frequency range for the applied magnetic field is from $5.10^3$ to $5.10^5$ Hz.

BRIEF DESCRIPTION OF THE DRAWINGS

FIG. 1 is a diagrammatic representation of the forces applied to a particle within a mass of metal remelted in a crucible by a method in accordance with the invention.

FIG. 2 is a diagrammatic partial sectional view of a straight crucible which may be used in one example of the method in accordance with the invention.

FIG. 3 is a diagrammatic partial sectional view, similar to that of FIG. 2, of a levitation crucible which may be used in another example of the method in accordance with the invention.

FIGS. 4a, 4b, 4c, 4d and 4e illustrate successive steps in carrying out a test, involving electron beam melting and solidification of a button test piece, for verification of the effectiveness of the inclusion decanting obtained with the method in accordance with the invention.

DETAILED DESCRIPTION OF THE INVENTION AND THE PREFERRED EMBODIMENTS

The method of remelting metal alloys, particularly nickel-based superalloys, in accordance with the invention is useful in the processing of these alloys as a refining technique, and particularly with a view to obtaining a separation or decanting of ceramic and other inclusions present in the material after a processing stage in a refractory crucible. The remelting operation is carried out in a conventional installation comprising means for creating a vacuum and promoting clean conditions. A crucible is used which is also of a known type, namely a cooled copper crucible of the sectional kind, referred to as a "cold crucible". The melting of the metal mass introduced into the crucible is effected by means of electro-magnetic inductors. The method of the invention is characterized by specific experimental conditions and an optimized control of the operating parameters, which alone permit the achievement of the desired results, i.e. an effective inclusion decanting.

FIG. 1 shows diagrammatically the position of a fluid particle 1 within the mass of liquid metal seen in a plane between line A representing the central axis of the crucible and line B, at a distance R from A, representing the boundary of the liquid metal. The magnetic field applied develops boundary electromagnetic forces or non-rotational forces, the effect of which is limited to a small thickness which is represented by e in FIG. 1 and is termed the "electromagnetic skin zone". These boundary forces result from the combined action of the applied alternating magnetic field with that of its own induced currents, and their effect is to create a magnetic pressure the value of which, as represented by curve C in FIG. 1, grows from zero at the periphery of the liquid metal to a maximum valve PM at the thickness e. In this skin zone of thickness e, a fluid particle 1 which consists of liquid metal is in equilibrium under the action of the electromagnetic forces symbolized by Fm directed towards the center of the electro-conductive field and the action of the pressure forces exerted on the particle and symoblized by Fp. On the other hand, a fluid particle 1 of a non-conductive material will be insensitive to electromagnetic forces as no current flows through the particle, and will therefore find itself displaced towards the wall of the crucible and the boundary of the liquid mass under the action of the pressure forces.

In addition the applied magnetic field generates volume or rotational forces which set the liquid metal in motion and thus effect an electromagnetic stirring of the mass. This stirring brings all the inclusions within the mass of liquid metal towards the electromagnetic skin zone, from which, as described above, the magnetic pressure forces move them towards the boundary of the liquid metal and the wall of the cold crucible. All the non-metallic particles, particularly the ceramic inclusions, are thus subjected to inclusion decanting or separation during the remelting process, and become concentrated along the cold walls of the remelted mass to be recast.

Effective separation of the inclusions is obtained, in accordance with the invention, by specific selection of the value of the parameters which condition the result. The separation effectiveness is, among other things, a function of the dimensions of the crucible used, represented by radius R, of decanting time t and of the size of the inclusions, this size being represented by their diameter d on the assumption that they will be generally spherical. As was mentioned above, the movement of the particles is due to the electromagnetic forces or rotational forces, which may be expressed in the form:

$$f_1 = B^2 \pi d^3 / 6 \mu e$$

wherein: e is the thickness of electromagnetic skin zone as defined above;
B is the magnetic field strength; and
$\mu$ is the magnetic permeability.
On the other hand, this movement is braked by viscosity forces which may be expressed in the form:

$$f_2 = 3 \pi m \, v \, d \, V$$

wherein: m is the volumetric mass of the liquid;
v is the viscosity of the liquid; and
V is the speed of movement of the inclusion.
In equilibrium, the two forces $f_1$ and $f_2$ are equal, and the decanting speed is deduced therefrom as:

$$V = B^2 d^2 / 18 \, \mu.e.m.v.$$

The size of the movable inclusions is, however, limited by an admissible decanting time. An absolute decanting of all inclusions would impose an infinite period of time. For an admissible time basis, such as $t = R/V$, the limit d obtained is:

$$d = (18 \mu.e.m.v. \, R/B^2 t)^{\frac{1}{2}}$$

It follows from this that the admissible diameter d of the inclusions decreases when time t increases or field strength B is increased.

On the other hand, the size of nondecanted inclusions d increases when the size of the crucible R increases or the viscosity v of the liquid increases.

In addition, the effectiveness of decanting is also conditioned by the frequency of the magnetic field applied, on which the ratio of non-rotational forces to rotational forces will depend. Indeed, an infinite frequency corresponds to an electromagnetic skin thickness e of zero, for which no decanting can take place. Similarly, in a continuous field, i.e. at nil frequency, there will be no effect. Accordingly, in order to obtain conditions for carrying out the process of the invention so as to achieve a satisfactory inclusion decanting efficiency in an industrial plant, the invention has defined a particular range of magnetic field frequencies to be applied under the conditions described above.

Firstly, an admissible ratio is defined between the skin thickness e and the radius R of liquid volume in the crucible such that the maximum thickness $e_1$ is equal to said radius R, and the minimum thickness $e_2$ is equal to one hundredth of this radius R. On introducing the relation:

$$\mu \sigma \omega^2 e^2 = 2$$

and the corresponding values of the screen parameter PE:

$$PE = R^2 \mu \sigma \omega$$

wherein: $\omega$ is the magnetic field pulsation;
$\sigma$ is the electric conductivity of the material; and
R and $\mu$ are as before,
the limit values of PE are thus obtained as:

$$2 \leq PE \leq 500$$

Thus, taking into account the dimensions of the crucible a theoretical range of frequencies is obtained, which is between one hundred Hertz and several megaHertz.

Under industrial conditions, an effectiveness criterion (CE) for the inclusion decanting may be obtained from the ratio of the numbers Np of particles per kilogram of material present in the metal before and after remelting by the method in accordance with the invention:

$$CE = \frac{Np \text{ before} - Np \text{ after}}{Np \text{ before}}$$

If this effectiveness criterion is adopted it will be in excess of 30% within the frequency range f of the magnetic field defined by:

$$50 \, Hz < f < 5 \times 10^6 \, Hz$$

It is this range of frequencies f of the magnetic field applied in the conditions described, particularly in a cold crucible and under clean vacuum conditions, which characterizes the method in accordance with the invention for remelting nickel-based superalloys.

An optimum range of frequencies, which will achieve an efficiency criterion in excess of 75% is $$5.10^3 < f < 5.10^5 \text{ Hz}$$

The tests carried out to make it possible to determine the frequency ranges of the magnetic field to be applied as defined hereinabove were implemented using two types of crucible corresponding to two embodiments of the remelting process in accordance with the invention.

The first type of crucible 2, shown diagrammatically in FIG. 2, is a straight crucible comprising, in a known manner, copper walls 3 cooled by internal tubes 4 in which circulate a cooling fluid, particularly water. The walls 3 are surrounded externally by electromagnetic inductor windings 5. The base of the crucible 2 comprises a drawing plate 6 associated with a drawing system symbolically represented at 7.

The charge 8 disposed in the crucible 2 is supplied with metal for casting in the form of a cylindrical ingot 9 introduced into the upper part, and the refined cast metal is drawn in the form of a cylindrical ingot from the bottom part. The operating conditions, particularly the applied magnetic field frequency, the calorific power of the plant, and the remelting rate are such that the nonmetallic inclusions are trapped in the cold parts situated at the periphery of the ingot. After drawing, a subsequent surface machining operation removes these inclusions.

The second type of crucible 10, diagrammatically represented in FIG. 3, is a levitation crucible of a known type in which the particular geometry of the walls 11 enables the greater part of the liquid metal to be held in levitation. It comprises, as before, internal cooling tubes 12 in the walls 11 supplied by a water box 13, and external electromagnetic inductor windings 14. The inclusions are again trapped in the cold parts of metal in contact with the walls of the cooled crucible. In comparison with the straight crucible of FIG. 2, a smaller surface for the cold parts in the present case is compensated for by a longer decanting time. In contrast, the crucible 10 permits, after inclusion separation under the same conditions previously described in application of the invention, the tapping of the refined metal through an opening 15 in the bottom part of the crucible 10 which is masked by a cooled retractable finger 16. In this case the separated inclusions remain trapped in the levitation crucible 10. A clean material is thus directly obtainable at the outlet from the crucible.

A test procedure has been used for evaluating the efficiency (CE) of the inclusion decanting obtained by the remelting process of the invention in its application to nickel-based superalloys. To carry out the test, a nickel-based superalloy powder of known composition, having, for example, a grain size of 75 μ and a melting point of 1350° C., is mixed with particles of zirconium having a grain size of between 120 and 150 μ and a melting point of 2800° C. to provide a mixture containing 200 particles per kilo of powder. The mixture of the superalloy powder and of the contaminating zirconium particles is achieved by a reverse swirling movement of a Turbula type for one hour. Densification is then carried out by hot isostatic compaction or by hot extrusion. The test pieces are then prepared specifically for the two types of crucible. The operational conditions of the remelting process of the invention, especially the frequency of the applied magnetic field, are then applied to remelting of the test samples. After holding in the molten state to effect the inclusion decanting of the invention, the refined liquid metal, depending on the crucible used, is either cast into an ingot mold of cooled copper and the ingot machined, in this test example, to a diameter of 25 mm and a height of 90 mm, or is drawn in ingot form, in this test example, to a diameter of 50 mm and a height in excess of 100 mm.

FIGS. 4a, 4b, 4c, 4d, 4e illustrate the stages of the electron beam melt button test which is subsequently carried out to determine the inclusion cleanliness of the ingots. FIG. 4a hows the electron beam melting of the ingot, and the different stages of collection of the inclusions are shown in FIGS. 4b and 4c.

FIGS. 4d and 4e show diagrammatically the solidification stages when cooling the button under vacuum. Member 20 symbolizes the cooled crucible in which the button is formed, and arrow 21 the electron beam. The contaminating particles are represented by 22, the solid metal by 23, and the liquid metal by 24.

The tests carried out according to this procedure gave the following results:
for the frequencies f of the magnetic field such that:

$$f < 50 \text{ Hz or } f > 1.10^7 \text{ Hz}$$

the efficiency criterion previously defined was found to be below 30%;
for the range of frequencies defined by the invention $$50 \text{ Hz} < f < 5 \times 10^6 \text{ Hz}$$

an efficiency criterion in excess of 30% was observed; and
for the optimum range of frequencies $$5.10^3 < f < 5.10^5 \text{ Hz}$$

an efficiency criterion in excess of 75% was obtained.

Obviously, numerous modifications and variations of the present invention are possible in light of the above teachings. It is therefore to be understood that within the scope of the appended claims, the invention may be practiced otherwise than as specifically described herein.

We claim:

1. A method of remelting a nickel-based superalloy, which comprises:
    placing said superalloy in a cooled copper crucible;
    melting said superalloy under clean vacuum conditions in said crucible so as to form a molten metal mass.
    applying a magnetic field to the molten metal mass in said crucible at a frequency within the range of from $5.10^3$ Hz and $5.10^5$ Hz and cooling the molten metal mass so as to effect simultaneously electromagnetic stirring of a liquid metal portion of the molten metal mass and concentrating at outer portions of the molten metal mass all non-conductive particles thus achieving inclusion decanting, and
    separating the metal mass from the non-conductive particles.

2. A method according to claim 1, wherein said crucible comprises a straight crucible, and which comprises introducing said superalloy in the form of a cylindrical ingot into an upper part of said crucible, and drawing refined, resolidified remelted metal from a bottom part of said crucible in the form of a cylindrical ingot for subsequent surface machining to remove inclusions collected at a periphery of the ingot.

3. A method according to claim 1, wherein said crucible comprises a levitation crucible and wherein the method comprises cooling the walls of the crucible, holding a greater part of the superalloy in levitation, and tapping refined metal through an opening of the crucible so that inclusions of the superalloy remain in the crucible and are trapped in portions of the molten metal mass in contact with the walls of said crucible which have been cooled.

* * * * *

UNITED STATES PATENT AND TRADEMARK OFFICE
CERTIFICATE OF CORRECTION

PATENT NO.   :   5,102,449

DATED        :   April 7, 1992

INVENTOR(S)  :   Christian A. B. Ducrocq et al.

It is certified that error appears in the above-identified patent and that said Letters Patent is hereby corrected as shown below:

On the Title page, please insert item [30], Foreign Application Data

--May 11, 1989 [FR] France.............89.06173--.

Signed and Sealed this

Twentieth Day of July, 1993

Attest:

MICHAEL K. KIRK

Attesting Officer

Acting Commissioner of Patents and Trademarks